(12) United States Patent
Guercioni

(10) Patent No.: US 8,726,493 B2
(45) Date of Patent: May 20, 2014

(54) CLAMPING SYSTEM OF SPECIAL CONDUCTORS FOR A STATOR OR ROTOR BAR WINDING FOR AN ELECTRIC MACHINE

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 0 days.

(21) Appl. No.: 13/387,729

(22) PCT Filed: Jul. 16, 2010

(86) PCT No.: PCT/IT2010/000312
§ 371 (c)(1),
(2), (4) Date: Jan. 28, 2012

(87) PCT Pub. No.: WO2012/007972
PCT Pub. Date: Jan. 19, 2012

(65) Prior Publication Data
US 2013/0104381 A1 May 2, 2013

(51) Int. Cl.
*H01F 7/06* (2006.01)
(52) U.S. Cl.
USPC .............. 29/606; 29/602.1; 29/605; 29/721; 29/735; 29/736; 310/179; 310/187; 310/198; 310/199; 72/299
(58) Field of Classification Search
USPC ............. 29/602.1, 605, 606, 603.24, 603.26, 29/603.236; 242/365.3, 365.6, 365.8, 366; 242/328, 329, 166; 310/179, 198, 199, 201, 310/210; 72/299
See application file for complete search history.

(56) References Cited

U.S. PATENT DOCUMENTS

| | | | |
|---|---|---|---|
| 1,556,893 A | 10/1925 | Ahlers et al. | |
| 6,376,961 B2 * | 4/2002 | Murakami et al. | 310/184 |
| 6,844,636 B2 * | 1/2005 | Lieu et al. | 310/43 |
| 6,951,054 B2 * | 10/2005 | Hirota et al. | 29/596 |
| 2001/0019234 A1* | 9/2001 | Murakami et al. | 310/180 |
| 2007/0180682 A1* | 8/2007 | Ueda et al. | 29/596 |
| 2009/0265909 A1 | 10/2009 | Guercioni | |

FOREIGN PATENT DOCUMENTS

| | | |
|---|---|---|
| DE | 10016151 | 3/2000 |
| DE | 100 16 151 | 10/2000 |
| DE | 10016151 | 10/2000 |
| EP | 1324470 | 7/2003 |
| GB | 2263653 | 8/1993 |
| WO | WO 92/06527 | 4/1992 |
| WO | WO92/06527 | 4/1992 |

* cited by examiner

*Primary Examiner* — Paul D Kim
(74) *Attorney, Agent, or Firm* — Tarter Krinsky & Drogin LLP

(57) ABSTRACT

It is described a clamping system (30) of special conductors (S1, S2, S3) for a stator or rotor bar winding (U1, S1, S2, S3) for an electric machine, such as connection terminals (S1), jumpers (S2), neutrals or star points (S3), etc. The system (30) allows the special conductors (S1, S2, S3) to be clamped during a twisting step and/or a step of picking up such conductors from a twisting device (250). The system comprises a system axis (T-T), a plurality of grippers (10) aligned or able to be aligned along a circumference lying on a plane substantially perpendicular to the system axis (T-T) and actuation elements (50, 60, 70, 80, 90) of the grippers (10). Each gripper includes a pair of jaws (32, 33) mounted so as to be mobile in a plane transversal to said system axis (T-T).

15 Claims, 15 Drawing Sheets

CLAMPING SYSTEM OF SPECIAL CONDUCTORS FOR A STATOR OR ROTOR BAR WINDING FOR AN ELECTRIC MACHINE

CROSS REFERENCE TO RELATED APPLICATIONS

This application is based on International Application Application No. PCT/IT2010/000312, filed on Jul. 16, 2010, the contents of which are incorporated herein by reference.

The present description refers to a clamping system of the special conductors, such as jumpers, neutrals or star points, connection terminals, etc., for a stator or rotor bar winding for an electric machine.

It is known to make stators or rotors for electric machines having a stator/rotor core in which there are a plurality of slots and also comprising a plurality of electric bar conductors inserted into the aforementioned slots and variously interconnected with one another to form one or more stator/rotor windings. The aforementioned stator/rotor windings with bar conductors are commonly known as stator/rotor bar windings or, more generally, bar windings. In particular, the state of the art includes bar windings made through electric bar conductors having an essentially rectangular cross section, where by rectangular we mean both the square section and the "flat" section with which a rectangular shaped section is normally indicated in which one of the two sides of the section is smaller in size than the other. Normally, the bar windings of the prior art comprise a plurality of so-called "basic" bar conductors and a plurality of so-called special bar conductors, such as connection terminals, jumpers, neutrals, etc., i.e. conductors necessary to complete the winding.

The aforementioned basic bar conductors are typically obtained from preformed bar conductors, usually through bending in a 'U' or 'P', starting from straight bar conductors. U.S. Pat. No. 7,480,987 describes an example of a method for preforming straight bar conductors to obtain the aforementioned preformed bar conductors or basic preformed conductors (in such a document called "hairpin conductors"). The preforming is such as to modify the shape of the straight conductors so that they can be suitably inserted into suitable radially aligned pockets or channels made in a twisting device suitable for deforming the aforementioned basic preformed conductors after insertion. In practice, the twisting device is used essentially to "spread apart" and shape the legs of the "U" or "P" shape to ensure that two legs of the same conductor, after having extracted this latter from the twisting device, typically through a special clamping assembly, can then be inserted into the slots of a stator or rotor core offset from one another by a predetermined pitch.

The United States patent application published with number US 2009/0178270 describes a twisting method with uniform pitch of basic preformed conductors after the insertion of these in the pockets of a twisting device. In the aforementioned twisting method some pockets of the twisting device are left free so that the basic preformed conductors, after having been at least partially shaped by the twisting, can then be transferred into a stator core comprising a circular array of vacant slots intended to be filled with the aforementioned special conductors.

The Applicant has observed that it is advantageous to also carry out the shaping of the special conductors, preferably simultaneously with that of the basic preformed conductors, starting from respective preformed configurations, in other words starting from special preformed conductors, through a twisting device of the type discussed above. However, it should be observed that the special preformed conductors differ in shape and size with respect to the basic preformed conductors. Moreover, the special preformed conductors, when they are inserted into the twisting device together with the basic preformed conductors, project, at least on one side of the twisting device, beyond end portions of the basic preformed conductors. The Applicant has therefore set itself the problem of how to ensure effective clamping of the special preformed conductors during one or more twisting steps of such conductors. In particular, the Applicant has set itself the problem of how to effectively control the deformation of the special preformed conductors during one or more twisting steps so that they deform taking up the desired final configuration that is necessary to correctly make the stator or the rotor. A further problem is encountered during the step of removing from the twisting device the special conductors, at least partially shaped after twisting, for the insertion of the latter into slots on the stator or rotor core. Indeed, with regard to basic conductors, such a removal step is usually carried out through a clamping assembly that comprises a clamping subassembly equipped with an inner annular array and with an outer annular array of holding fingers. Such arrays of holding fingers are suitable for radially clamping both legs of each basic conductor, after a twisting step of such conductors, which are respectively arranged in a radially inner pocket and in a radially outer pocket of the twisting device. More specifically, the fingers of the inner array engage the radially inner side of the legs arranged in the radially inner pockets, whereas the fingers of the outer annular array engage the radially outer side of the legs arranged in the radially outer pockets. A clamping assembly of such a type is described for example in the patent document published as US 2009/0265909. However, since by its configuration each special preformed conductor is such as to be able to be inserted only in the pockets of the inner array or only in the pockets of the outer array of the twisting device, a clamping assembly of the type discussed above would not allow such conductors to be held properly after twisting for the insertion in the stator/rotor core. As a matter of fact, each special conductor would undergo the radial thrust either only of the outer holding fingers of the outer array or only of the inner holding fingers of the inner array of the clamping assembly. This would therefore determine an incorrect positioning of the special conductors during the aforementioned removal step, for example causing an undesired inclination thereof, preventing or in any case significantly hindering the insertion of such conductors inside the slots of the stator or rotor core.

The present description sets itself the task of providing a clamping system of the special conductors for a stator or rotor winding for an electric machine that allows the problems discussed above with reference to the prior art to be solved.

This and other tasks are accomplished through a clamping system as defined in the attached first claim in its most general form and in the dependent claims in some particular embodiments.

Also forming the object of the present invention are a clamping assembly as defined in any one of claims 13-15 and a containment apparatus for twisting as defined in the attached claim 16.

Moreover, an object of the present invention is a process as defined in any one of claims 17-18.

The invention will become clearer from the following detailed description of embodiments thereof given as an example, and therefore in no way limiting, in relation to the attached drawings, in which.

In the attached figures elements that are the same or similar will be indicated with the same reference numerals.

For the purposes of the present description by "flat" or "square" bar conductor we mean a bar conductor having four substantially flat sides, each joined at adjacent sides, typically by a rounded edge.

Therefore, the words "flat" or "square" or equivalent words used to describe the cross section of a bar conductor are used in the general sense and must not be interpreted to exclude the fact that such bar conductors have significantly rounded edges that join the substantially flat sides. The expression "flat conductor" should be taken in the sense that the conductor has two opposite sides the distance between which is greater than the distance between the remaining two opposite sides. For the purposes of the present description the expression "rectangular conductor" should be taken as a generalisation of flat conductor and of square conductor, the square conductor being a special case of a rectangular conductor, in which the four sides are of equal dimensions.

Figure 1:
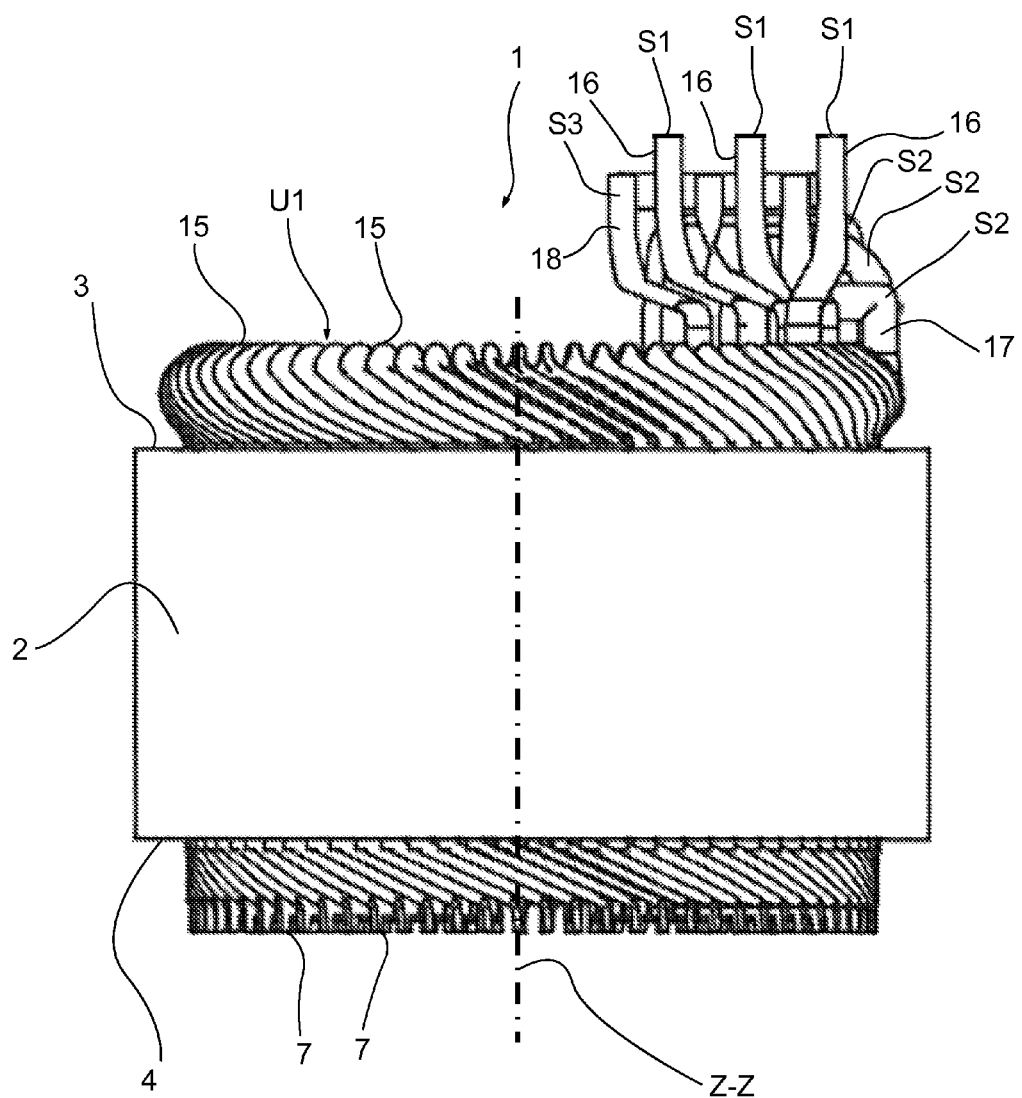
FIG. 1 shows a front view of an embodiment of a stator including a stator bar winding comprising a plurality of basic conductors and a plurality of special conductors.

With reference to FIG. 1, a stator comprising a stator core 2 is globally indicated with 1. For example, the stator 1 is the stator of an electric machine like for example an electric motor, for example for an electric or hybrid traction vehicle.

It is clear that such a stator can also be used in an electric machine used as a generator or used both to carry out the function of a motor and the function of a generator alternately.

In the attached figures just the stator of such an electric machine has been represented since it is considered that the remaining parts of an electric machine or in general of an electric or hybrid traction vehicle are widely known by the man skilled in the art.

For the sake of simplicity and brevity of description, in this document a rotor will not be described in detail since it is considered that a man skilled in the art, who knows the structure of a rotor very well, can without any difficulty foresee to apply the teachings of the present description to a rotor.

In a per sé known way, the stator core 2 comprises a lamellar tubular main body, for example made from magnetic material, which extends axially (axis Z-Z) between two opposite faces 3,4, respectively called insertion face 3 and welding face 4.

The main body of the stator core 2 comprises a plurality of slots (not represented in the figures) that extend axially in the thickness of the main body and that are intended to be crossed by bar conductors U1, S1, S2, S3 that as a whole form at least one stator bar winding. In accordance with an embodiment, the bar conductors U1, S1, S2, S3 are surface coated with an insulating layer of insulating material, like for example an insulating enamel.

In accordance with an embodiment, the aforementioned bar conductors U1, S1, S2, S3 are copper conductors and are rectangular conductors, and more preferably flat conductors, since they have a pair of opposite faces that are farther apart than the remaining two opposite faces.

In accordance with an embodiment, the bar conductors U1, S1, S2, S3 comprise a first plurality of basic conductors U1, and a second plurality of special conductors S1-S3 which for example comprise terminals S1, jumpers S2 or the neutral S3 or star point S3. As known, these bar conductors S1-S3 represent so-called "special" elements or conductors, provided to complete the winding. In the present description, the expression "basic conductors" is used exclusively to identify conductors that are not special elements or special conductors of the type described above, i.e. which are not specifically provided to functionally complete the winding.

The basic bar conductors U1 of the first plurality have a bent portion 15, or connection portion, which projects from the insertion face 3 of the stator core 2 and two legs 5 (FIG. 2) the free end portions 7 of which project from the other face 4 of the stator core 2, i.e. from the welding face 4. The bent portion 15 is also often known in the field as "head portion". Amongst these basic conductors there is preferably a first type of conductors and a second type of conductors that differ each other mainly for the distance between the legs 5. As known to a man skilled in the art, this difference also entails a certain difference in the overall length of the conductor.

Figure 2:
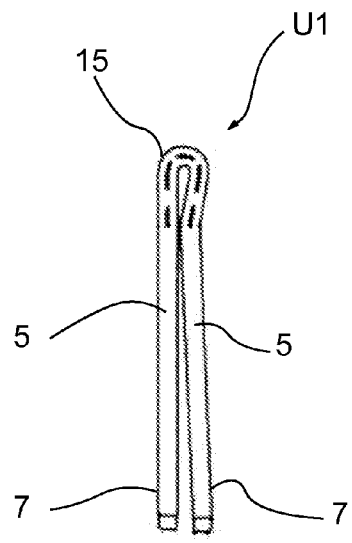
FIG. 2 shows a front view of a basic preformed conductor according to an embodiment.

In FIG. 1, the basic bar conductors U1 are illustrated in their substantially definitive configuration inside the stator core, where such a configuration is obtained by spreading apart and deforming the legs 5 of a bar conductor preformed in a "U" or "P" as for example represented in FIG. 2, by a predetermined amount or pitch. From now on for the sake of simplicity of description and without for this reason introducing any limitation, the bar conductors preformed in a U or P shape can be indicated in general as "preformed U-shaped conductors", by U meaning an approximation of the P of FIG. 2. Such conductors can also be indicated as "basic preformed conductors". Such preformed conductors (also known as "hairpin conductors") can be obtained for example, and not for limiting purposes, through a preforming method as described in U.S. Pat. No. 7,480,987.

The spreading apart of the legs of the preformed U-shaped conductors and their shaping is generally called twisting and the predetermined amount, or pitch, is called "twisting pitch". The latter is measured by number of slots of the stator 2 (not represented in the figures). With reference to FIG. 1, the basic bar conductors U1 comprise a first and a second plurality of basic conductors obtained by twisting of the basic preformed conductors of the same or similar type to the one represented in FIG. 2 according to a twisting pitch respectively equal to eight and nine slots. It is clear that the aforementioned twisting to spread apart the legs 5 of the same preformed U-shaped conductor must, after having inserted said preformed conductors into the stator core, be followed by a bending of the end portions 7 (FIG. 2), in order to allow the welding of such portions required to make the winding. Again with reference to FIG. 1, it is also clear that in order to ensure that all of the basic conductors U1 after twisting have connection portions 15 arranged at the same height, said first and second plurality of basic conductors must be obtained from basic preformed conductors of different length.

Figure 3A:
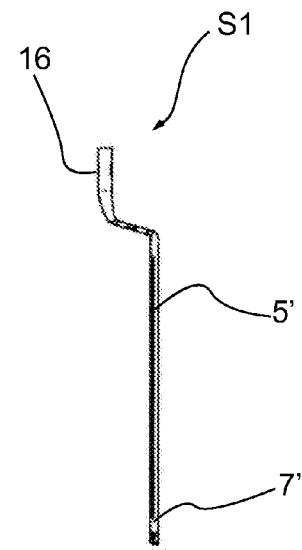
FIGS. 3a-3c show front views of three types of special preformed conductors.
Figure 3B:
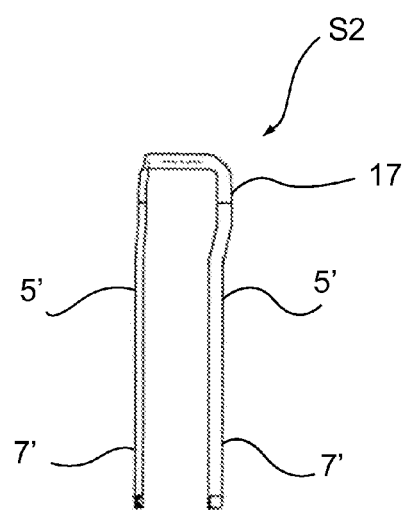
Figure 3C:
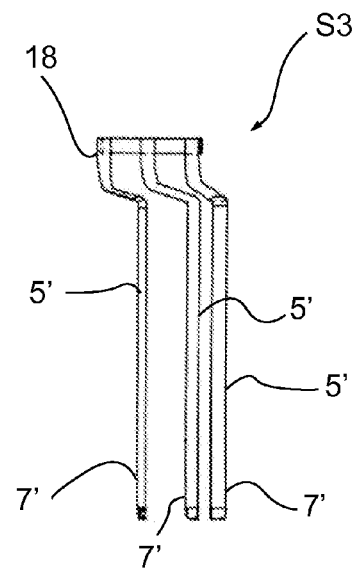

FIGS. 3*a*-3*c* represent some embodiments of special conductors S1-S3 each having at least one leg 5' having a free end portion 7'. More specifically, such figures respectively illustrate a connection terminal S1 having a single leg 5', a jumper S2 having two legs 5' and a star point or neutral S3 having three legs 5'. It should be observed that in FIGS. 3*a*-3*c* the special conductors S1, S2, S3 are "special preformed conductors", in other words special conductors each represented in the respective preformed configuration obtained starting from straight bar conductors and before being subjected to one or more twisting steps of the type discussed above. Indeed, the special conductors S1, S2, S3, before taking up the respective final configurations necessary to properly make the stator (FIG. 1), are also subjected to at least one twisting step analogous to the one undergone by the basic preformed conductors U1. In other words, as far as the conductors S2, S3 are concerned, such a twisting step or steps determine a spreading apart and a deformation of the legs 5' and of the end portions 7'. Clearly, as far as the special conductor S1 is concerned, the twisting step or steps, on the other hand, determine just a deformation of the single leg 5' and of the end 7' thereof. In FIG. 1 it is possible to see that the special conductors S1-S3 comprise variously shaped opposite end portions 16, 17, 18 projecting from the insertion face 3. Moreover, even if not visible in FIG. 1, in the configuration of FIG. 1 such conductors have the respective end portions 7' bent and projecting from the welding face 4.

It should be observed that in the present description the expressions "basic conductors" and "special conductors" are used in general with the purpose of distinguishing the conductors U1 from the conductors S1, S2, S3. Therefore, unless specified otherwise, the expressions "basic conductors" and "special conductors" can be used to indicate the conductors U1 and the conductors S1-S3, respectively, irrespective of the configuration taken up after one or more twisting steps of the type discussed above. In other words, U1 can for example indicate both preformed basic conductors and basic conductors in their definitive configuration inside the stator core 2. The same thing applies to the conductors S1-S3.

Figure 4:
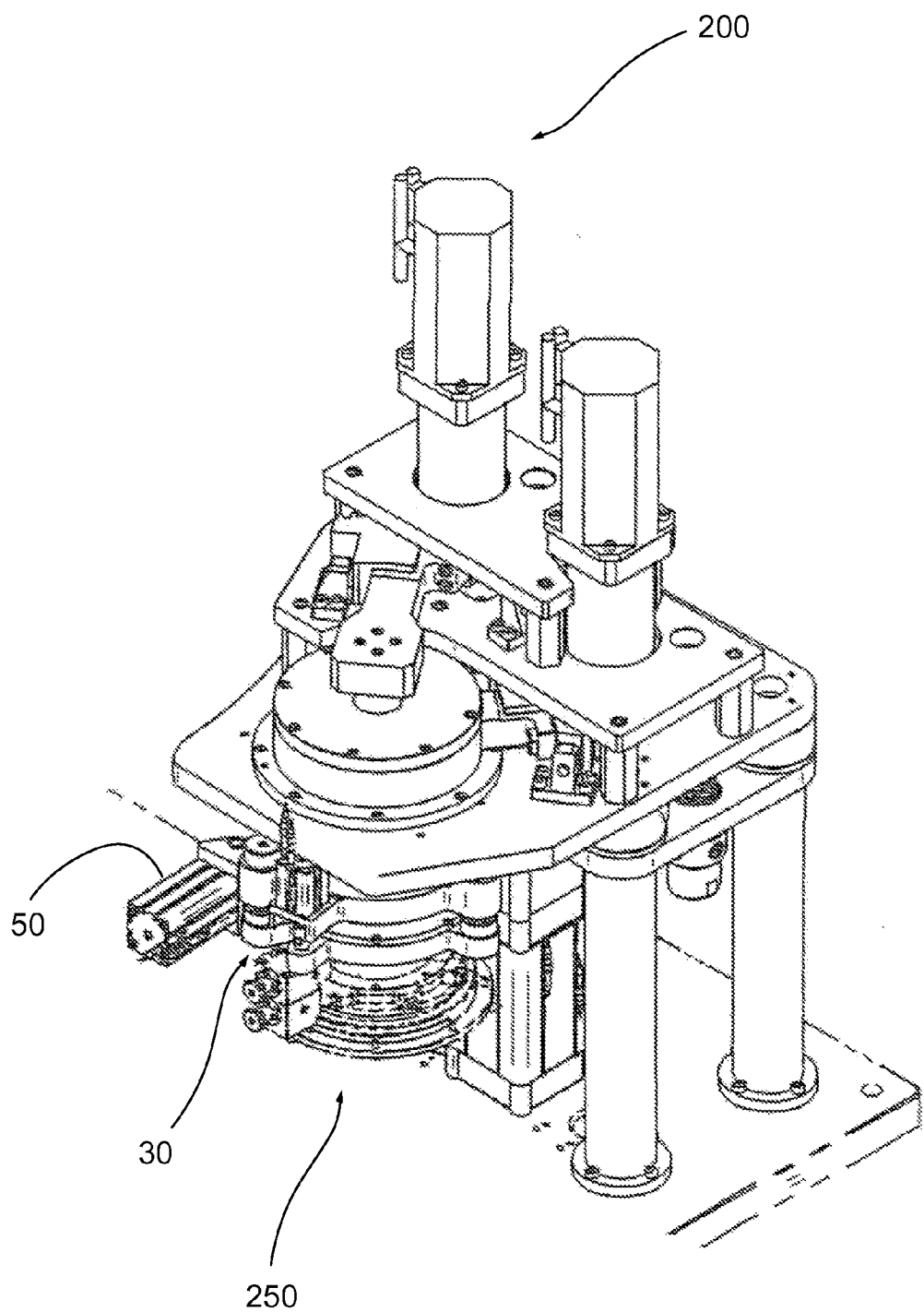
FIG. 4 shows a perspective view in which it is possible to see a containment apparatus for the twisting and a twisting device suitable for cooperating with such an apparatus.
Figure 5:
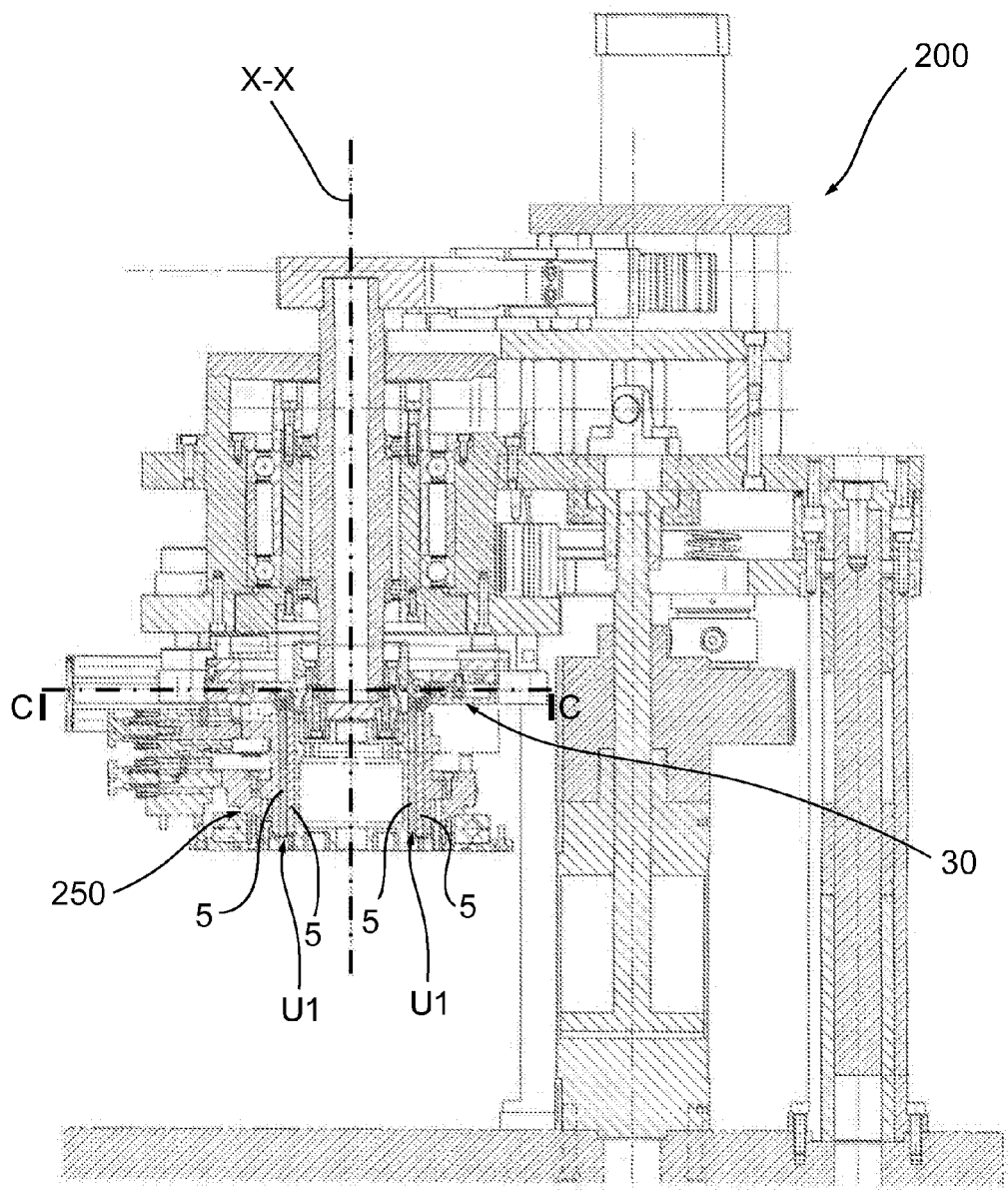
FIG. 5 shows a partial section view of the containment apparatus and of the twisting device illustrated in FIG. 4.
Figure 9:
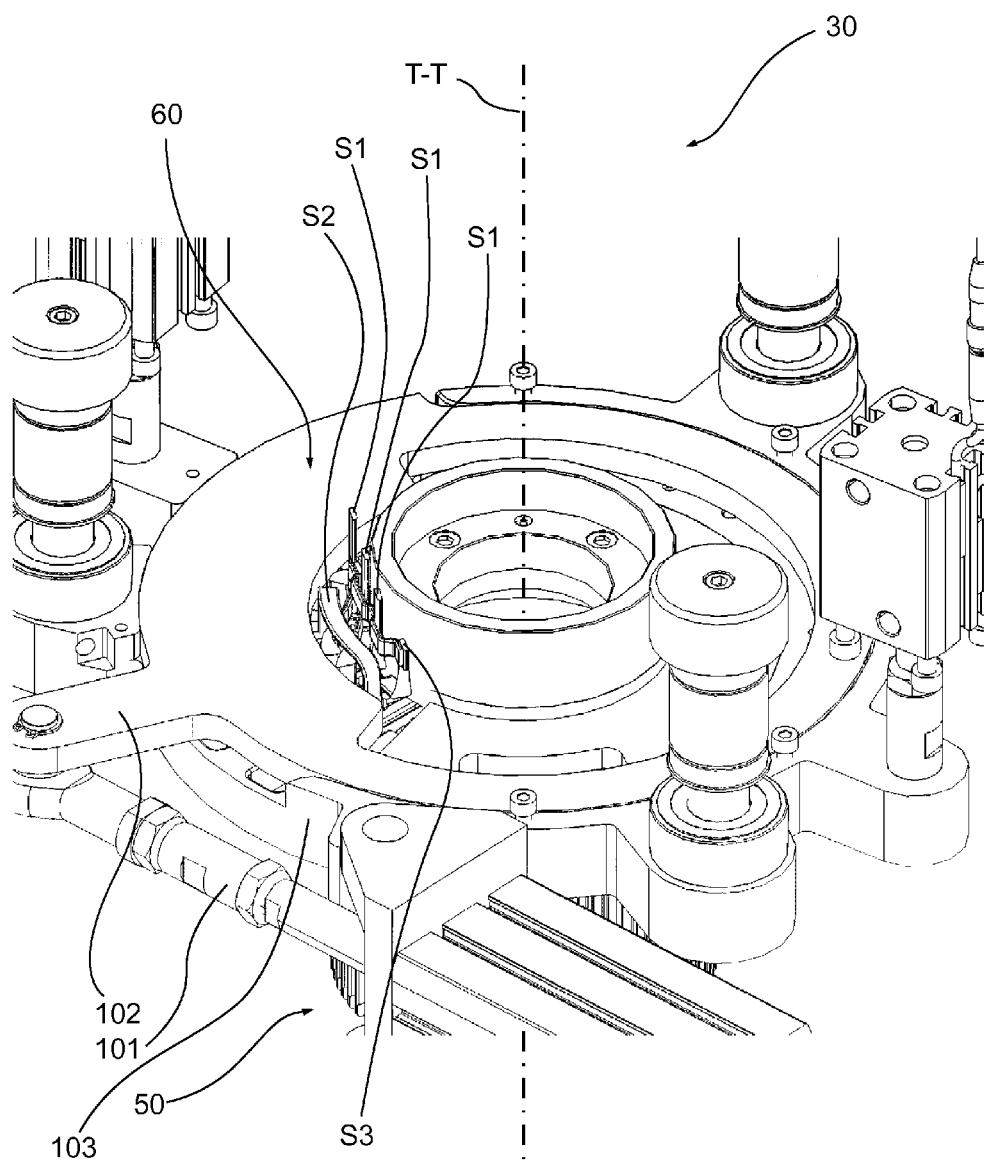
FIG. 9 is a perspective view showing a clamping system of the special conductors according to a currently preferred embodiment.
Figure 10:
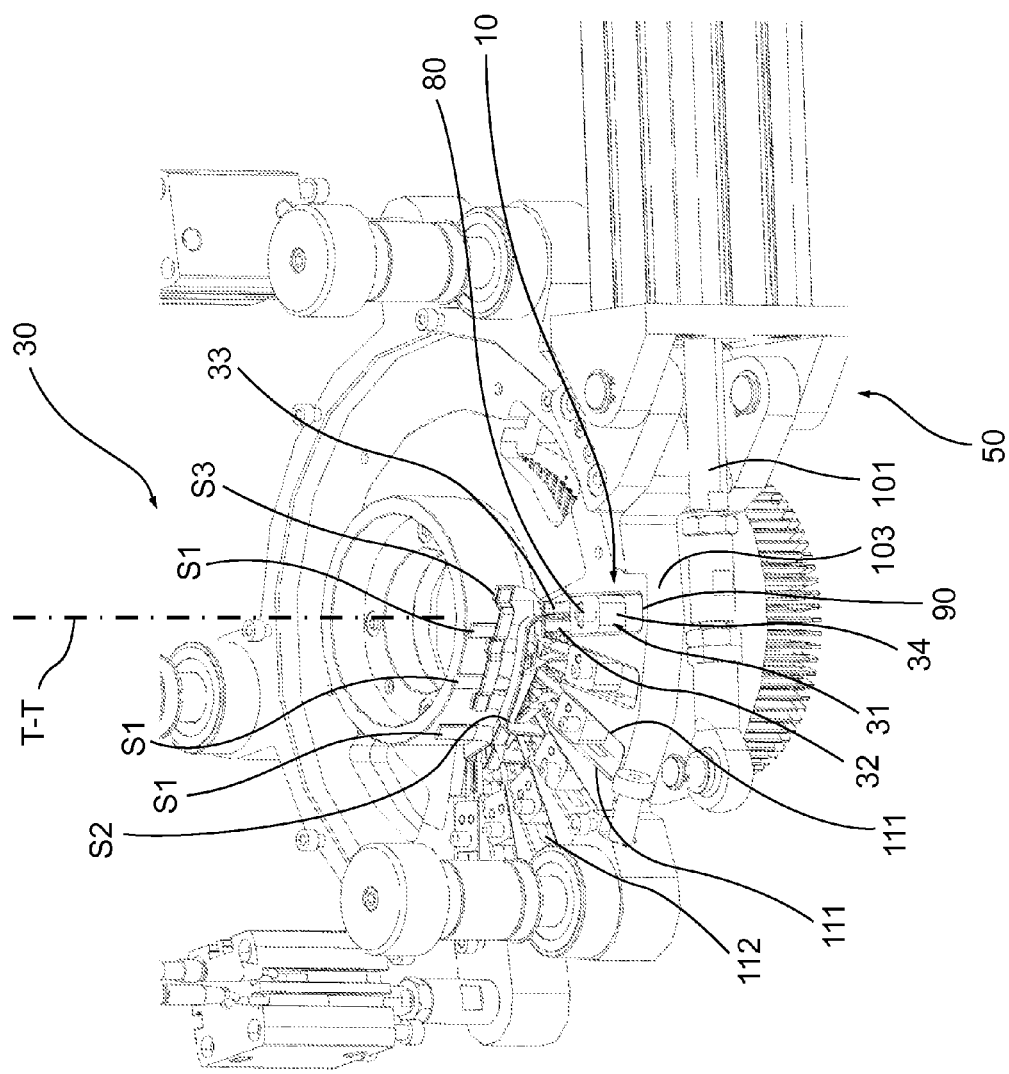
FIG. 10 is a perspective view of the clamping system of FIG. 9 in which a component has been removed.
Figure 12:
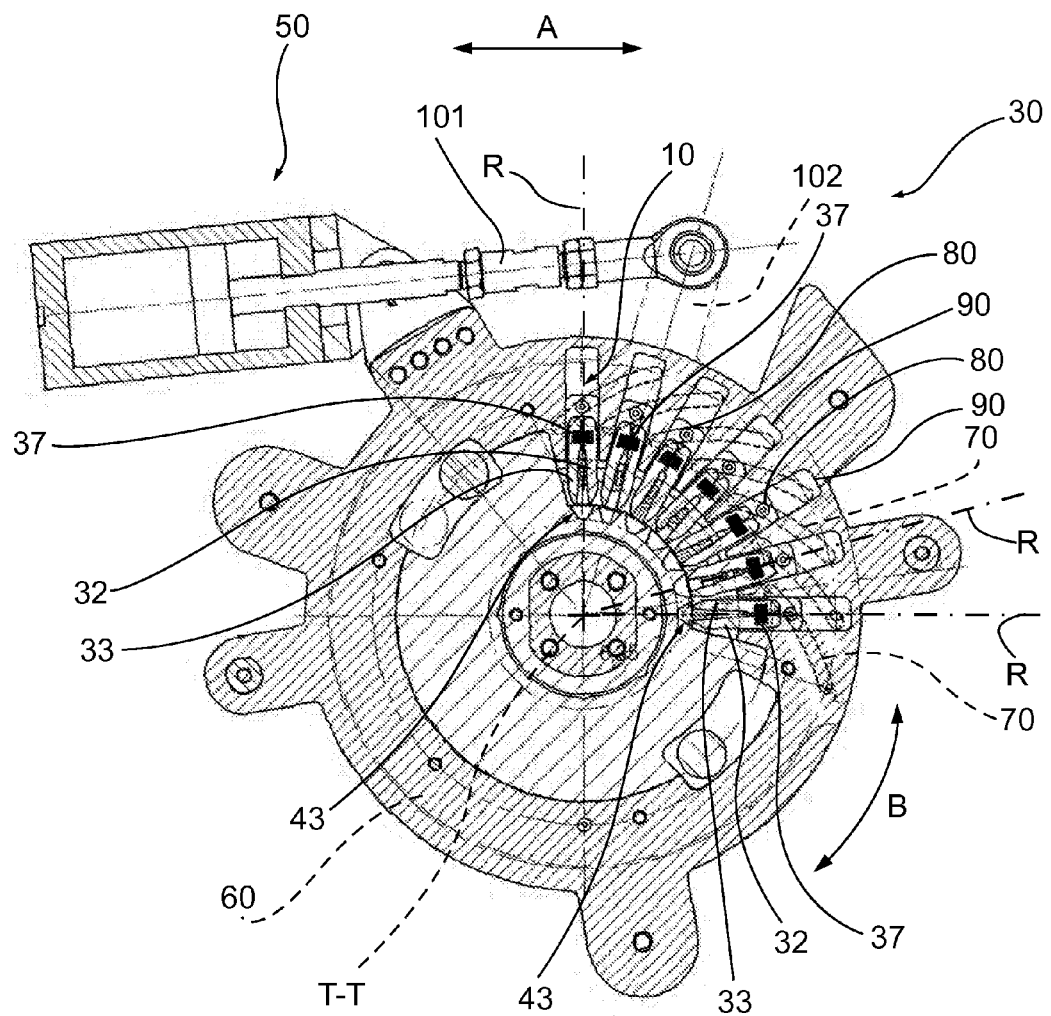
FIG. 12 is a cross section view along the line C-C of FIG. 5, in which it is possible to see the clamping system of FIG. 9.

With reference to FIGS. 9, 10 and 12 a currently preferred embodiment of a clamping system is illustrated, generally indicated with 30, for clamping the special conductors S1, S2, S3 during at least one twisting step of the type discussed above and/or during a step of picking up such conductors from a twisting device, like for example a device of the type indicated with 250 in FIGS. 4 and 5.

With reference to FIG. 10, the system 30 comprises a plurality of grippers 10, in the example seven grippers 10, aligned or able to be aligned along a circumference lying on a plane substantially perpendicular to a system axis T-T and preferably having its centre on such an axis. Preferably the system axis T-T coincides with the axis of the winding or with the central axis around which the bar conductors U1, S1, S2, S3 are arranged during the twisting or during a step of removing such conductors from a twisting device of the aforementioned type. According to a preferred embodiment, the system axis T-T is in particular a vertical axis. According to an advantageous embodiment, the grippers 10 are suitable for being arranged uniformly distributed and aligned or able to be aligned along an arc of circumference defined by an angle of less than 180°. According to a particularly preferred embodiment illustrated in the figures, such an angle is equal to about 90°. However, in accordance with less preferred embodiments, the grippers 10 could also be distributed, according to the specific requirements, uniformly or not uniformly along an arc of circumference defined by an angle of over 180° or even along the entire circumference.

With reference to FIG. 10, each gripper 10 includes a pair of jaws 32, 33 or pair of holding arms 32, 33, mounted so as to be mobile in a plane transversal to the system axis T-T. Preferably, each gripper 10 comprises a gripper body 31 including a body portion 34 to which the pair of arms 32, 33 is connected. Preferably, the holding arms 32, 33 are hinged to the body portion 34, or block portion 34, so as to carry out a pincing movement along the aforementioned plane transversal to the system axis T-T. More specifically, preferably the arms 32, 33 of each gripper are independently hinged so as to be able to each rotate about a respective axis parallel to the system axis T-T.

Figure 13:
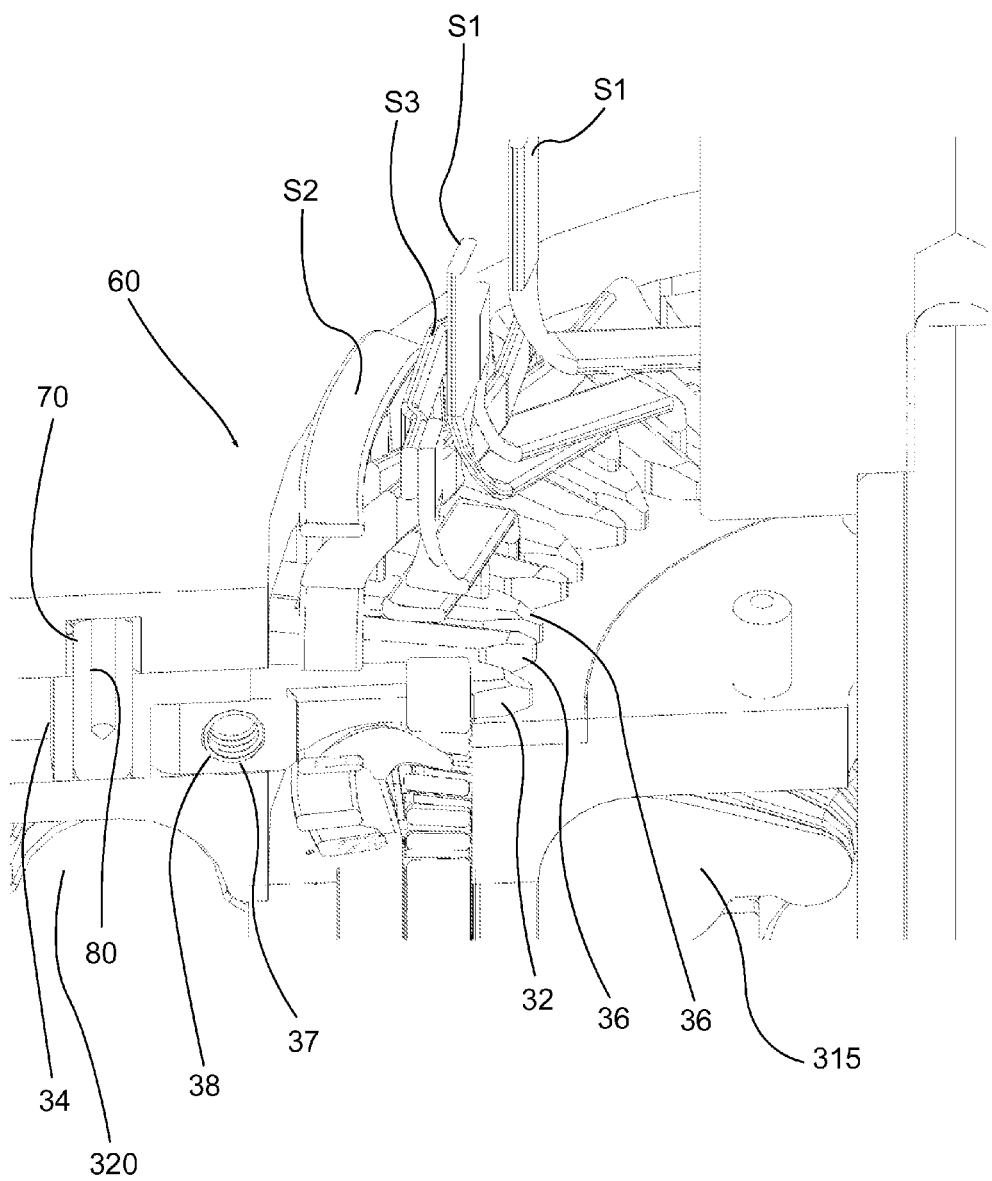
FIG. 13 is a perspective section view of a part of the clamping assembly of FIG. 7 in which it is possible to partially see the clamping system according to the embodiment of FIG. 9.
Figure 15:
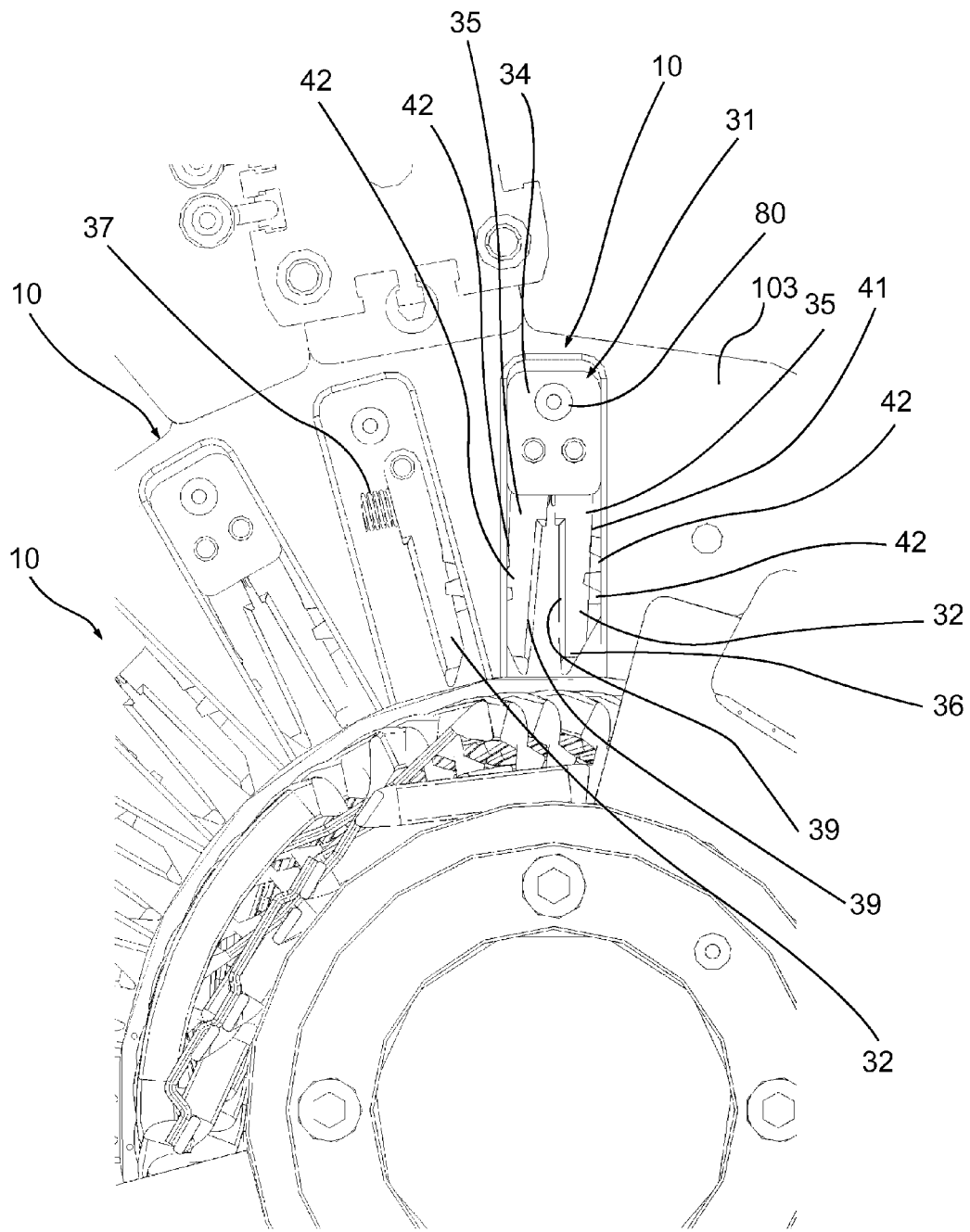
FIG. 15 is an almost frontal perspective view similar to that of FIG. 14 showing an enlarged detail of the clamping system and in which such a system is represented in a second operative configuration with some components removed.
Figure 16:
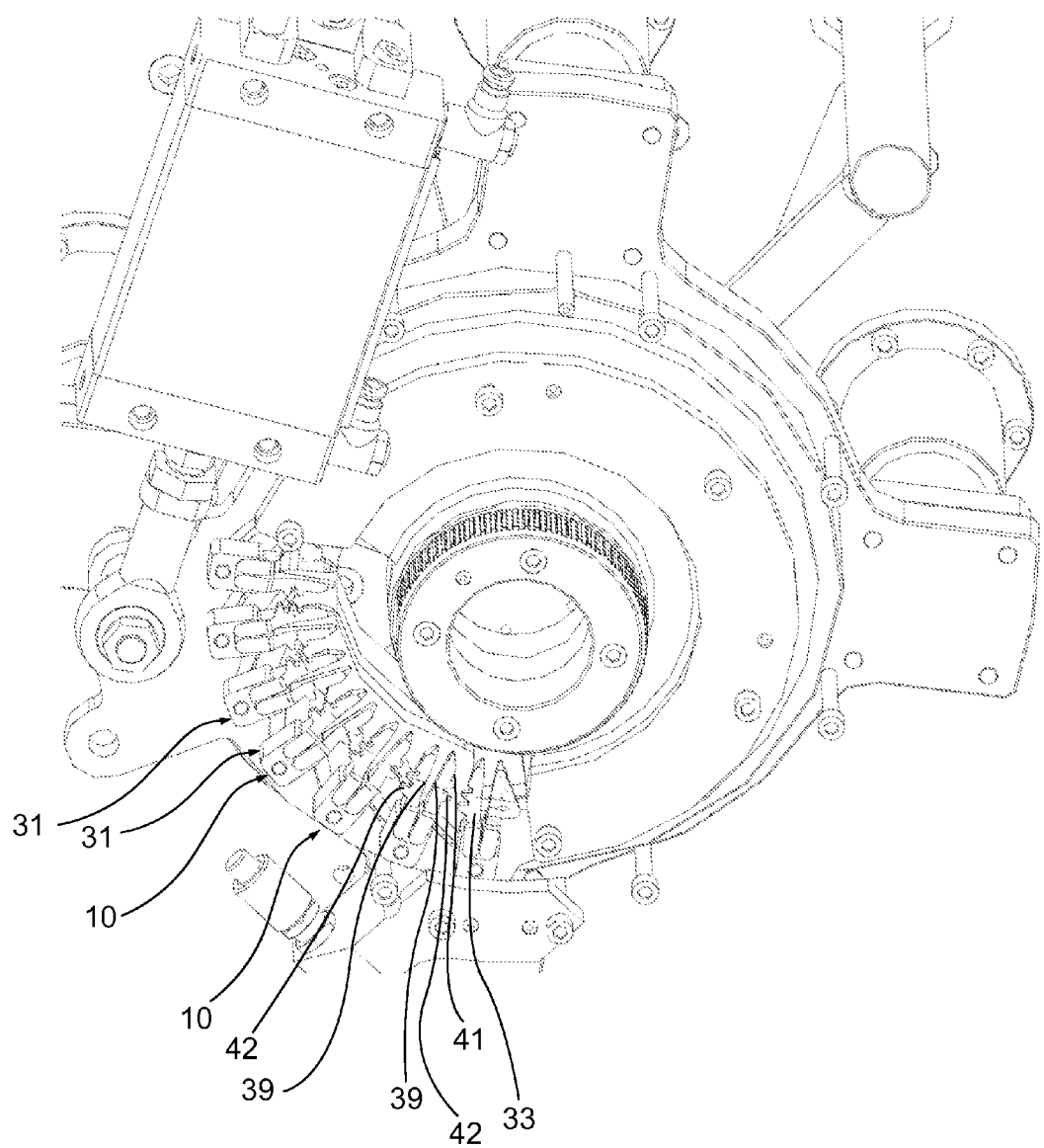
FIG. 16 is a perspective view of the clamping system of FIG. 9 in which some components of the system have been removed.

With reference to FIG. 15, in which one of the grippers 10 has been represented with some components removed, including the respective arm 33, it can be seen that each arm 32, 33 includes a join portion 35 proximal to the block 34 and an opposite free end portion 36 distal from the block 34. According to an embodiment, the clamping system 30 comprises automatic opening elements 37 of the grippers 10 including elastic elements connected to the arms 32, 33 of each gripper to spread apart such arms. In FIG. 12 such automatic opening elements 37 are schematically represented by black rectangles. Going back to FIG. 15, preferably the automatic opening elements 37 comprise a spring 37 arranged between the arms 32, 33 and having respective opposite end portions housed in housing seats 38 or cavities 38 (one of which is represented in FIG. 13) provided at the join portions 35 on the inner side 39 of each of the arms 32, 33. The inner side 39 of the arms 32, 33 is in particular the side of each of such arms that faces towards the other arm of the pair 32, 33. The outer side 41 of the arms 32, 33, on the other hand, is the side of each arm 32, 33 opposite the aforementioned inner side 39. According to an advantageous embodiment each arm 32, 33 has at least one abutment projection 42 (FIGS. 15 and 16) projecting laterally from the respective outer side 41.

Figure 14:
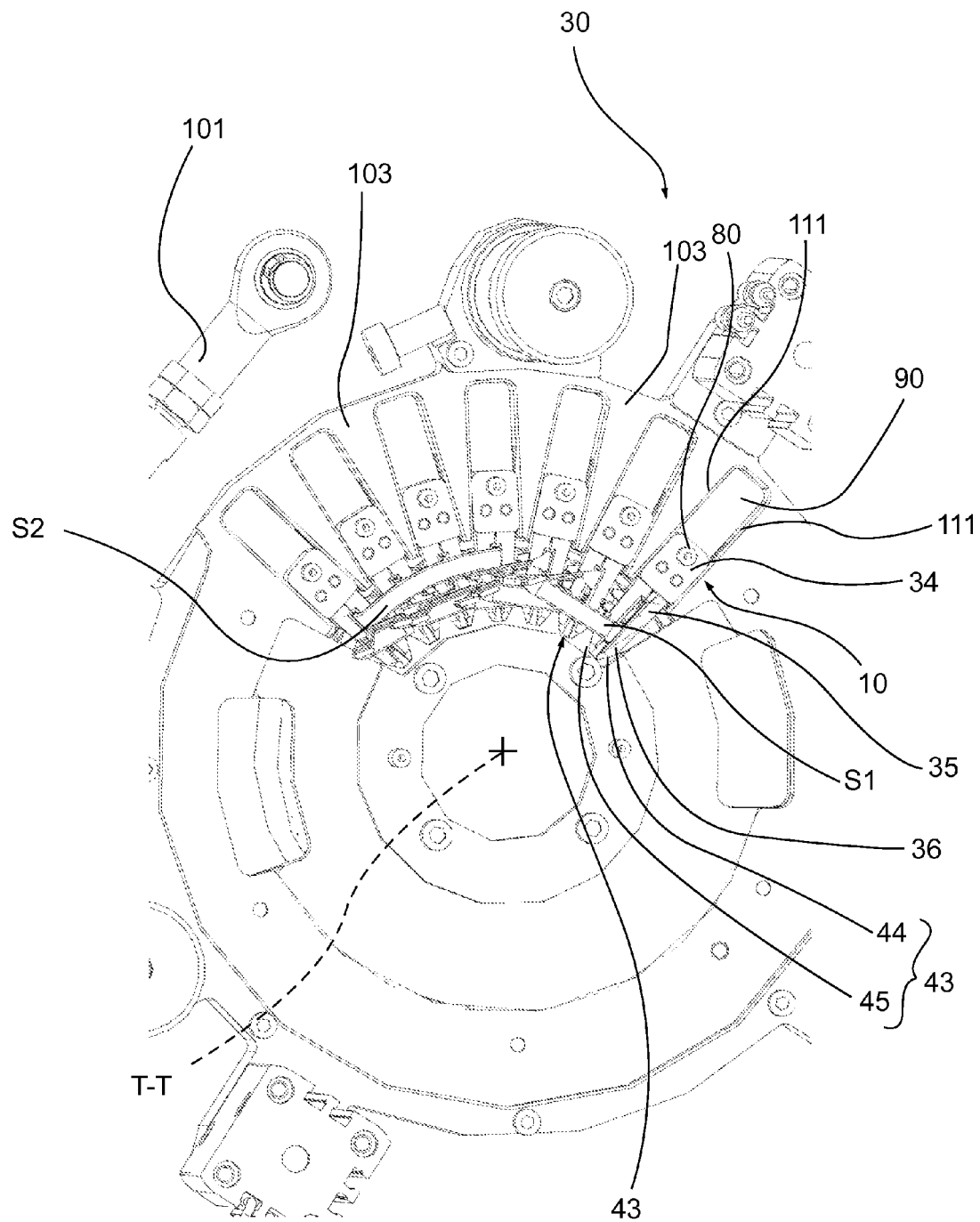
FIG. 14 is an almost frontal perspective view partially representing the clamping system of the special conductors of FIG. 9 in a first operative configuration.

With reference to FIGS. 12 and 14, according to an embodiment the system 30 comprises automatic closing elements 43 of the arms 32, 33 of the grippers 10. Such automatic closing elements preferably comprise a forced passage 43 situated frontally to the holding arms 32, 33 of each gripper 10. In the example, the seven forced passages 43 each comprise a pair of converging walls 44, 45 that converge towards the system axis T-T. Such walls are suitable for cooperating with the distal portions 36 of each pair of arms 32, 33 to bring together such arms. It should be observed that the fact of providing the elastic elements 37 and the forced passages 43 makes it advantageously possible to give the system 30 a structure that is particularly simple and at the same time very reliable without the need of providing complex systems to close and open the grippers 10.

Figure 11:
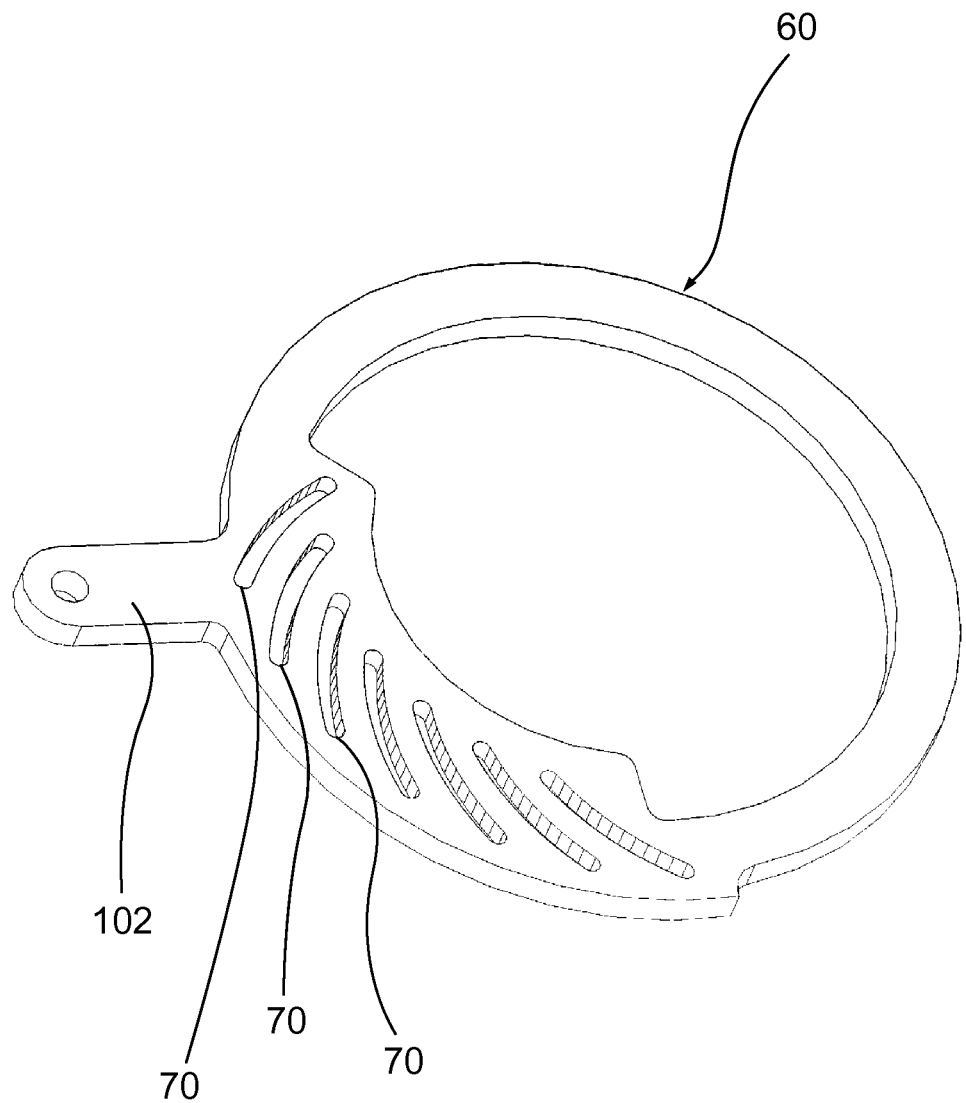
FIG. 11 is a perspective view of the component removed in FIG. 10 represented from the opposite side with respect to what can be seen in FIG. 9.

With reference to FIGS. 9, 10 and 11, the clamping system 30 comprises actuation elements 50, 60, 70, 80, 90 of the grippers 10, able to be activated to make each gripper take up an operative clamping configuration (FIGS. 10 and 14), in which the holding arms 32, 33 are relatively closer together to clamp a portion of at least one of the special conductors S1, S2, S3, and an operative release configuration (FIG. 15) in which the holding arms 32, 33 are relatively farther apart or spread apart with respect to the clamping configuration to release the aforementioned portion of the special conductor.

According to an embodiment each gripper 10 of the system 30 is mounted so as to be able to slide along a respective sliding direction R (FIG. 12) transversal to the system axis T-T. Regarding this, according to a particularly advantageous embodiment, for example for the compactness given to the system 30, the actuation elements 50, 60, 70, 80, 90 comprise a rotary transmission member 60, able to be set in rotation through an actuator 50, for example as indicated by the double arrow B in FIG. 12. Moreover, according to such an embodiment, the actuation elements comprise kinematic coupling elements 70, 80 and fixed guide elements 90 (FIGS. 10 and 11) that are suitable for cooperating with the transmission member 60 and with the grippers 10 to convert the rotary motion of the member 60 into a sliding motion or translating motion of such grippers along the respective sliding directions R. In the embodiment used here as an example, in which the grippers of the system 30 can be aligned along a circumference lying on a plane perpendicular to the system axis T-T and centred on such an axis, the sliding directions R are radial directions, in other words directions perpendicular to the system axis T-T and passing through such an axis. Again with reference to FIGS. 9 and 10, in the example the actuator device 50 comprises a linear actuator 50 equipped with an actuator rod 101 suitable for translating along an actuation direction indicated by the double arrow A in FIG. 12. The rotary transmission member 60, on the other hand, is preferably configured like an annular plate 60 equipped with a projecting tongue 102 intended to be hinged to an end portion of the rod 101. Again with reference to FIGS. 10 and 11, according to an embodiment the kinematic coupling elements 70, 80 comprise a plurality of actuations cams provided on the annular plate 60 and corresponding coupling elements 80 provided on the grippers 10 that are suitable for cooperating with the actuations cams 70 to allow a sliding coupling between the plate 60 and such grippers. Preferably, the cams 70 are formed from a plurality of grooves 70, in the example seven curved grooves, each suitable for slidably receiving a respective projection 80 or pin 80 provided on each gripper body 31. With reference to FIGS. 10 and 12, it can be seen that the fixed guide elements 90, in other words fixed relative to the grippers 10, are suitable for guiding the sliding of the grippers along the sliding directions R. In the example such guide elements comprise a plurality of guide chambers 90, in the example seven chambers 90, each suitable for housing a respective gripper 10. Preferably, the chambers 90 are formed in the profile of a plate-like member 103 or fixed plate 103 (FIG. 10) having an annular shape, which in the example is suitable for also forming a support base for the sliding of the grippers 10. In the example the chambers 90 are closed on a respective side, preferably on top, by the plate 60. Each chamber 90 comprises a pair of opposite guide walls 111 (FIG. 10). On each of the walls 111 there is advantageously a recess 112. The recesses 112, in the example fourteen recesses 112, are suitable for at least partially receiving the holding arms 32, 33 of each gripper 10 when the latter takes up the release configuration, in other words when the arms are spread apart.

Having described the structure of the system 30, an example of operation thereof will be described hereafter with reference to the embodiment illustrated in the figures.

Let us initially consider the system 30 with the grippers 10 in the release configuration (FIG. 15). In such a configuration the body 31 of each gripper 10, comprising the arms 32, 33, is almost entirely received in the respective guide chamber 90 so that the end portions 36 of the arms 32, 33 do not substantially project outside of such a chamber. In the release configuration the arms 32, 33 of each gripper are in particular spread apart by the maximum amount thanks to the action of the spring 37 and they are each partially received inside a respective recess 112. By activating the actuator 50, the rod 101 slides in a first orientation in the direction A dragging the annular plate 60 into rotation in a first orientation around a respective rotation axis, preferably coinciding with the system axis T-T. Due to the rotation of the plate 60, the combined action of such a plate and of the guide chambers respectively on the pins 80 of the grippers through the grooves 70 and on the blocks 34 determines, simultaneously, the sliding of the pins 80 through the grooves 70 and the translation of the grippers 10 along the sliding directions R. In FIG. 12, where the annular plate 60 and the grooves 70 are represented with broken lines in order to make the structure and operation of the system 30 clearer, the grippers 10 are illustrated in an intermediate configuration between the aforementioned clamping and release configurations during a sliding step along the directions R. It should be observed that according to the currently preferred embodiment used as an example here, the actuation of the plate 60 determines a simultaneous translation of all of the grippers 10 of the system 30. However, according to an alternative embodiment, the actuation elements of the grippers 50, 60, 70, 80, 90 could be made so as to allow the actuation of each gripper individually, in other words independently from that of the other grippers 10 of the system 30. At a certain moment during the sliding step of the grippers 10 towards the system axis T-T, the free end portions 36 of each gripper engage the walls 44, 45 of the forced passages 43 (FIG. 12). Such walls, while the translation of the grippers proceeds, determine the progressive closing of the arms of the grippers 10 until each gripper takes up the clamping configuration (FIGS. 10 and 14). In other words, the forced passages 43 determine a progressive coming together of the holding arms 32, 33 of each gripper until they clamp, on two opposite sides, a respective portion of at least one of the special conductors S1, S2, S3 that is arranged between such arms. More specifically, in the clamping configuration the grippers 10 are preferably suitable for clamping between the arms 32, 33 the special conductors S1-S3 at the relative legs 5' and, even more specifically, near to the end portions 16, 17, 18 opposite the end portions 7'. In FIG. 10 it is possible to see, for example, a jumper S2 having the two legs 5' each clamped by a respective gripper 10 or the legs 5' of connection terminals S1 each clamped by a respective gripper 10. It should be observed that according to an advantageous embodiment, in the clamping configuration each pair of holding arms is suitable for laterally clamping, on two opposite sides, the respective portion of the special conductor S1, S2, S3 so as to contain or support such a conductor in the substantially circumferential direction with respect to the system axis T-T. By circumferential direction we mean in particular a direction corresponding to that of the tangent to a circumference lying on a plane perpendicular to the system axis T-T and having its centre on such an axis. In particular, in the attached figures, in which flat bar conductors are illustrated having the longer sides of the rectangular section of the legs 5' extending in the essentially radial direction, the arms 32, 33 of each gripper 10 clamp each special conductor along the longer sides of the rectangular section. However, it should be observed that if the special conductors S1-S3 were arranged so that the longer sides of the rectangular section of the legs 5' were extended in the substantially circumferential direction, the arms 32, 33 of the grippers 10 would clamp the legs 5' along the shorter sides of the rectangular section. Moreover, it should be observed that when the grippers 10 take up the clamping configuration, in which each gripper takes up a position relatively more advanced towards the system axis T-T, or radially more inner, with respect to the release configuration, the arms 32, 33 of the grippers project outside of the guide chambers 90 for a relevant portion of the arms themselves.

From the clamping configuration, by actuating the rod 101 in the opposite orientation to before, the system 30 operates in reverse to that described above. In other words, the grippers 10 translate in the opposite orientation to before along the directions R until the release configuration (FIG. 15) is reached in which each gripper body 31 takes up a position relatively set back, or radially more outer, with respect to the aforementioned advanced or radially more inner position. In particular, it should be observed that while each gripper slides towards the aforementioned set back position leaving the forced passage 43, the spring 37 is suitable for spreading apart the pair of arms 32, 33 so as to allow the gripper to take up the release configuration.

Figure 6:
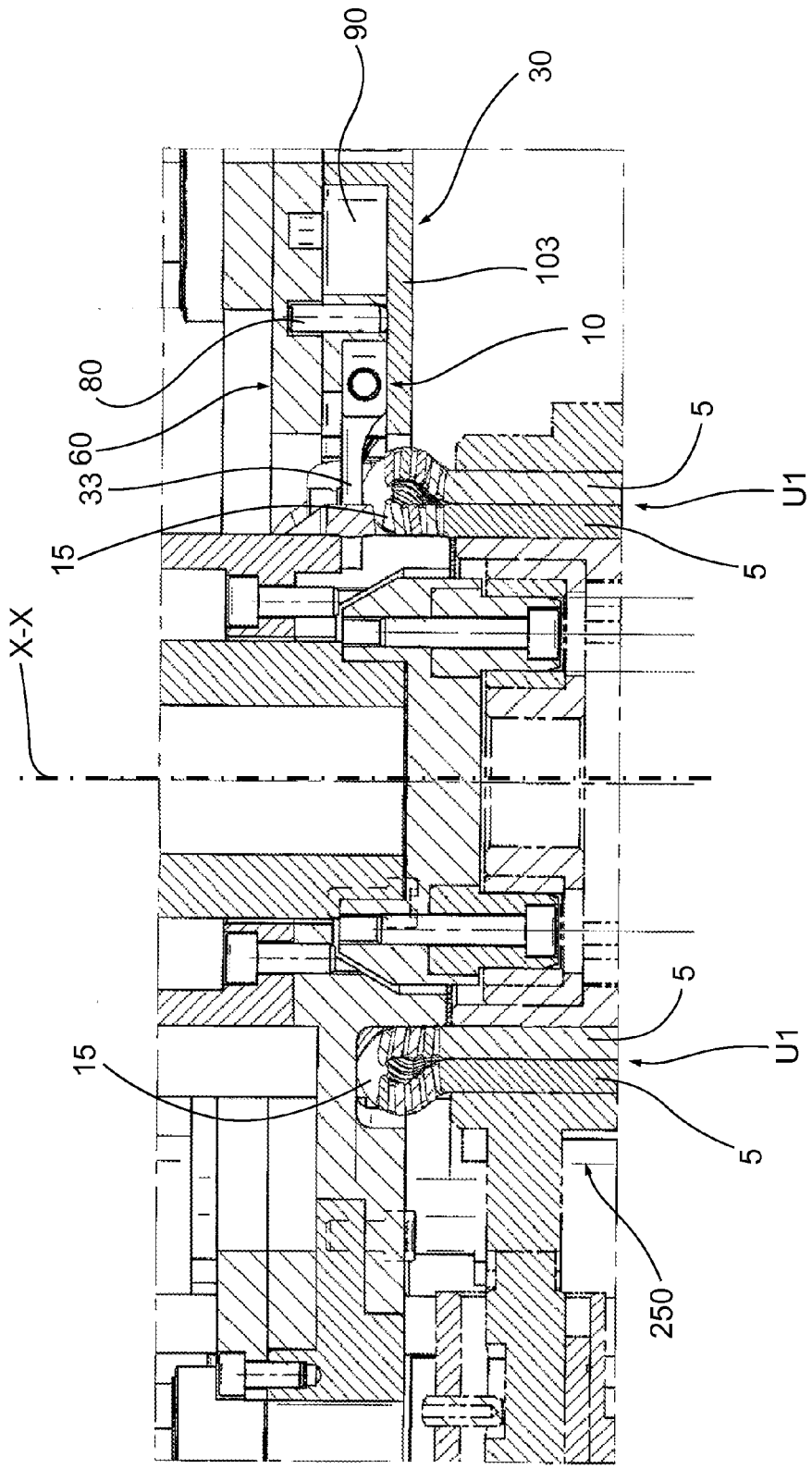
FIG. 6 shows an enlarged detail of FIG. 5.

Now with reference to FIGS. 4 and 5, such figures illustrate a currently preferred embodiment of a containment apparatus for the twisting, generally indicated with 200, comprising the clamping system 30. The apparatus 200 is in particular an apparatus suitable for cooperating with the twisting device 250 and that is suitable for obtaining a containment or an abutment of the bar conductors during twisting, and more specifically a containment of the bent end portions 15 of the basic conductors U1, so as to control and allow their correct shaping. In some cases, such containment can also comprise a pressure exerted on the bar conductors. The twisting device 250 is a device including a plurality of channels or pockets inside of which the legs 5, 5' of the conductors U1, S1, S2, S3 are intended to be inserted. Such a device is suitable for carrying out a first twisting, preferably a simultaneous twisting of the bar conductors U1, S1, S2, S3, which is aimed at spreading apart and deforming the legs 5, 5' of such conductors as previously described above. The device 250 can be made, without for this reason introducing any limitation, for example as described in the patent application published as US 2009/0178270 or as described in patent application No. PCT/IT2010/000174 not yet published at the filing date of the present application. As can be observed for example in FIG. 5, the apparatus 200 and the twisting device 250 have a shared twisting axis X-X. Preferably the twisting axis X-X coincides with the system axis T-T of the clamping system 30. FIG. 6 illustrates an enlarged detail of FIG. 5 in which the system 30 is shown in greater detail. In particular, in such a figure it is possible to see one of the grippers 10 having the arms 32,33 situated beyond the bent end portions 15 of the basic conductors U1 so as to avoid interference with such conductors during the movement of the holding arms 32, 33. In the case in which the twisting axis X-X is a vertical axis, the arms 32, 33 are arranged above the aforementioned ends of the conductors U1. More specifically, it can be seen that the arms 32, 33 are advantageously arranged immediately above the aforementioned end of the conductors U1 so as to also be able to carry out a containment or abutment function, during the twisting operation, of basic conductors U1 possibly arranged between the special conductors S1, S2, S3.

It should be observed that, with the exception of the system 30, the structure and the general operation of the apparatus 200 is well known by the man skilled in the art. Therefore, he can easily modify a known containment apparatus for twisting so as to include the clamping system 30. Therefore, for the sake of brevity of description, the structure and operation of the apparatus 200 will not be described in detail here.

Figure 7:
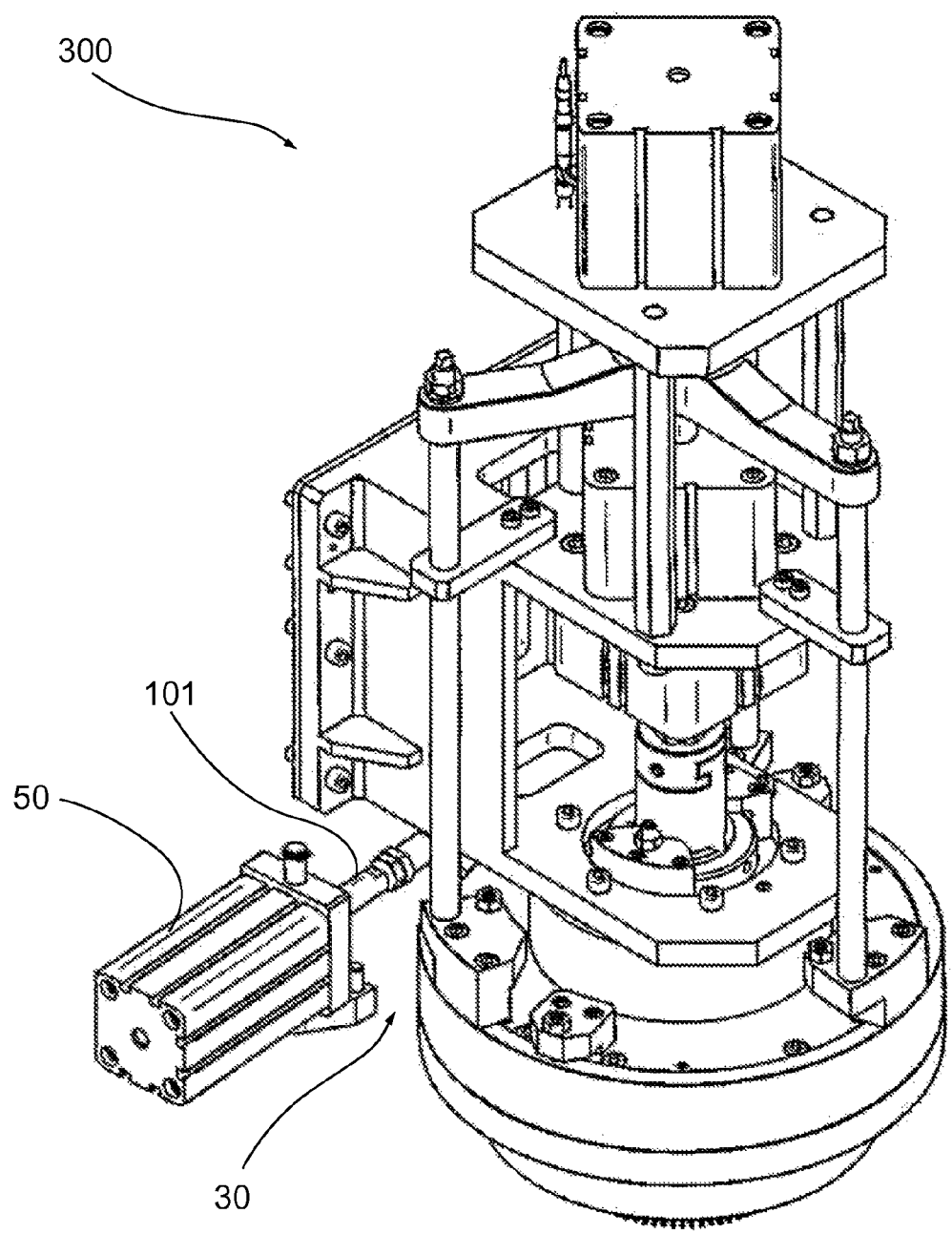
FIG. 7 shows a perspective view of a clamping assembly according to a currently preferred embodiment.
Figure 8:
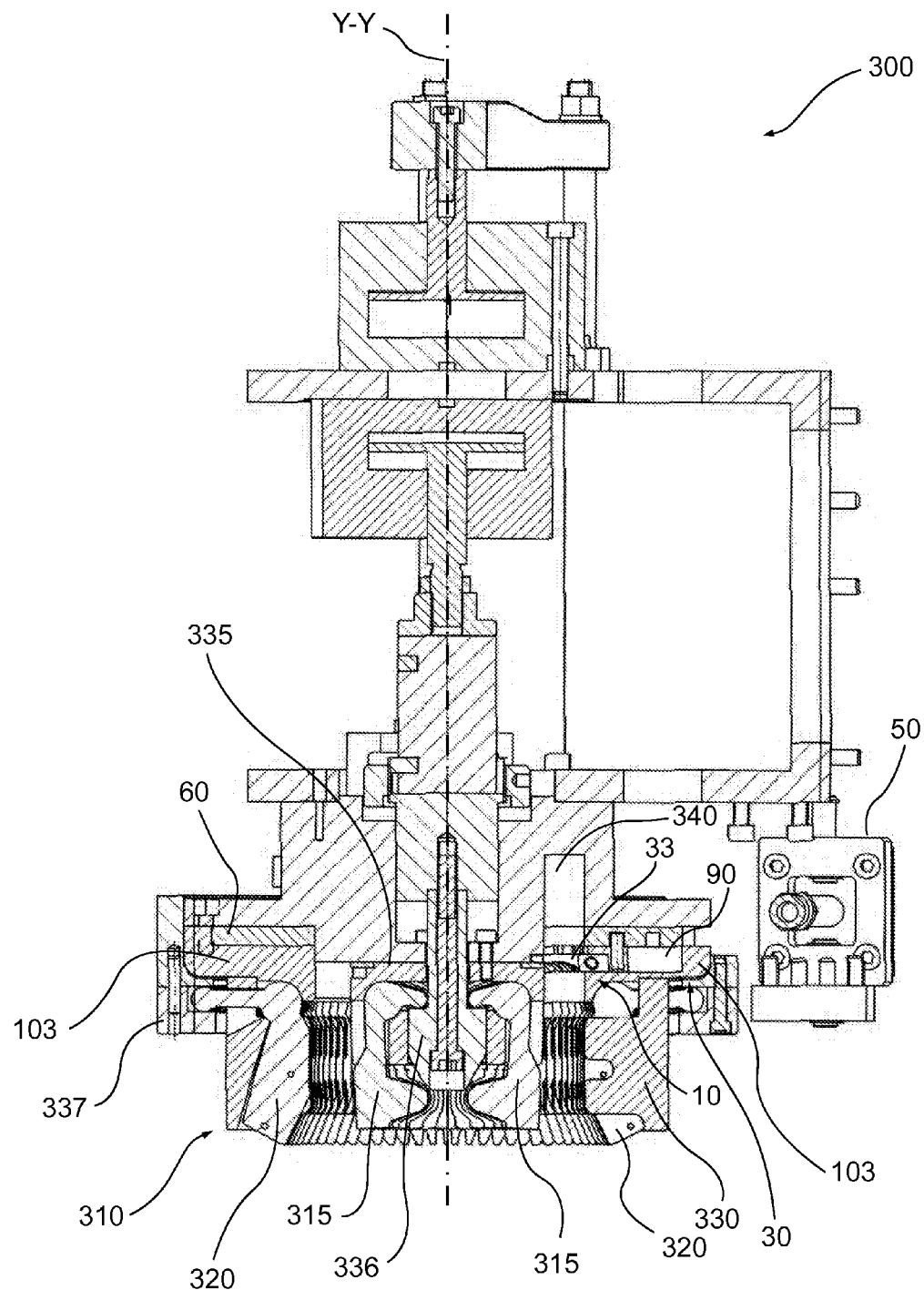
FIG. 8 shows a section view of the clamping assembly of FIG. 7.

With reference to FIGS. 7 and 8, such figures illustrate a currently preferred embodiment of a clamping assembly 300 suitable for picking up en bloc the bar conductors U1, S1, S2, S3 from the twisting device 250 (FIG. 4). Preferably, such a clamping assembly is also used to partially insert the conductors U1, S1, S2, S3 into the slots of the stator core 2. As can be seen in FIG. 8, the clamping assembly 300 comprises a clamping sub-assembly 310 and the clamping system 30 according to the present description. According to an embodiment, the clamping sub-assembly 310 in the example comprises a plurality of inner holding fingers 315 or inner annular array, a plurality of outer holding fingers 320 or outer annular array, and a plurality of projections 330 arranged between the outer fingers. The fingers 315, 320 and the projections 330 extend around a clamp axis Y-Y that preferably coincides with the system axis T-T of the system 30. As can be seen in FIG. 8, the fingers 315, 320 and the projections 330 extend substantially in the direction of the clamp axis Y-Y. The inner fingers 315 are captured for rotation between first members 335, 336. The outer fingers 320 are captured for rotation between second members, including in the example a clamp member 337 and the plate 103 of the system 30. In the example the inner fingers 315 and the outer fingers are set in rotation, respectively, through the translation of the member 336 and through the translation of the member 337 along the clamp axis Y-Y. More specifically, the fingers of the inner array and of the outer array are suitable for cooperating to clamp or engage the legs 5, 5' of the bar conductors U1, S1-S3 radially with respect to the clamp axis Y-Y. The operation of the clamp sub-assembly 310, even if with slight differences mainly concerning the actuation of the inner fingers 315, is on the whole substantially analogous to that of the clamping sub-assembly described in the patent application published as US2009/0265909 and therefore it will not be described any further.

Again with reference to FIG. 8, it should be observed that, assuming that the clamp axis Y-Y is a vertical axis, the system 30 is advantageously situated above the inner and outer fingers 315, 320. Advantageously, according to an embodiment the clamping assembly 300 comprises a receiving cavity 340 suitable for receiving the end portions 16, 17, 18 of the special conductors S1, S2, S3, when the bar conductors U1, S1, S2, S3 are clamped by the fingers 315, 320 of the group 300.

Based on what has been described above, it is therefore possible to understand how a clamping system according to the present description allows the tasks mentioned above to be achieved.

The fact of providing a clamping system of the special conductors comprising a plurality of grippers aligned or able to be aligned along a circumference substantially perpendicular to the axis of the system and each having a pair of holding jaws that are mobile in a plane transversal to such an axis, indeed advantageously makes it possible to clamp the portions of the special conductors during twisting so as to support such conductors substantially in the direction of twisting. This allows optimal control of the deformation of the special conductors during twisting. Moreover, when it is applied inside a clamping assembly, a clamping system of the special conductors having such characteristics advantageously makes it possible to clamp each special conductor in a substantially circumferential direction with respect to the axis of the clamping assembly in this way avoiding an undesired inclination of the special conductors. Furthermore, particularly when it is used in a clamping assembly including a clamping sub-assembly, a clamping system having such characteristics makes it possible to clamp each special conductor in at least two different regions along the longitudinal extension of such a conductor, in this way allowing excellent control of the positioning and inclination of the special conductor itself.

Without affecting the principle of the invention, the embodiments and the details can be widely varied with respect to what has been described and illustrated purely as non-limiting examples, without for this reason departing from the scope of the invention as defined in the attached claims.

The invention claimed is:

1. Clamping system of special conductors for a stator or rotor bar winding for an electric machine, the clamping system being suitable for clamping said special conductors during a twisting step and/or a step of picking up such conductors from a twisting device, the clamping system comprising:
   a system axis (T-T);
   a plurality of grippers aligned or adapted to be aligned along a circumference lying on a plane substantially perpendicular to the system axis (T-T), each gripper including a pair of jaws or holding arms mounted so as to be mobile in a plane transversal to said system axis (T-T); and
   actuation elements of the grippers adapted to be activated to make each gripper take up:
      (a) an operative clamping configuration, in which said holding arms are relatively closer together to clamp on two opposite sides a portion of at least one of said special conductors, and
      (b) an operative release configuration, in which said holding arms are relatively farther apart to release said portion of the special conductor;
   said clamping system being characterized in that:
      each of said grippers comprises a gripper body slidably mounted along a sliding direction (R) transversal to the system axis (T-T), the gripper body including a body portion to which said holding arms are hinged and being suitable for taking up a position relatively more advanced towards the system axis (T-T) when the gripper takes up said clamping configuration, and a position relatively more set back with respect to said advanced position when the gripper takes up said release configuration; and
      each of said grippers comprises closing elements and opening elements of the holding arms of the grippers, said closing elements comprising a forced passage arranged frontally to each pair of holding arms and suitable for engaging such arms during the sliding of the gripper body towards said advanced position to make the gripper take up said clamping configuration, and said opening elements comprising elastic elements connected to said pair of holding arms and suitable for spreading apart such arms while the gripper slides towards said set back position leaving the forced passage so as to allow the gripper to take up said release configuration.

2. Clamping system according to claim 1, wherein said holding arms are mobile in a plane substantially perpendicular to the system axis (T-T).

3. Clamping system according to claim 1, wherein in said clamping configuration said holding arms are suitable for clamping said portion of the special conductor in a substantially circumferential direction with respect to the system axis (T-T).

4. Clamping system according to claim 1, wherein said circumference along which said grippers are or can be aligned is centered on the system axis (T-T), said transversal direction being a radial direction (R) and said advanced and set back positions being a radially more inner position and a radially more outer position, respectively.

5. Clamping system according to claim 1, wherein each of said holding arms includes a join portion proximal to said body portion and an opposite free end portion distal from the body portion, said elastic elements being arranged between said pair of holding arms at the join portions.

6. Clamping system according to claim 1, wherein said actuation elements comprise:
   a rotary transmission member that can be set in rotation about a rotation axis; and
   kinematic coupling elements and fixed guide elements that are suitable for cooperating with said transmission member and with said grippers to convert the rotary motion of said transmission member into the sliding motion of the grippers along said sliding directions (R).

7. Clamping system according to claim 6, wherein said kinematic coupling elements comprise a plurality of actuations cams provided on said transmission member and corresponding coupling elements provided on the grippers, said cams being suitable for cooperating with said corresponding coupling elements to allow a sliding coupling between said transmission member and the grippers, and wherein said fixed guide elements are suitable for cooperating with the grippers to guide the sliding of the grippers along said sliding directions (R).

8. Clamping system according to claim 7, wherein said cams are formed from a plurality of grooves and wherein said corresponding coupling elements comprise a projection provided on each gripper body, each projection being suitable for being slidably received in a respective groove.

9. Clamping system according to claim 7, wherein said fixed guide elements comprise a plurality of guide chambers each suitable for receiving a respective gripper body and each including a pair of opposite guide walls suitable for guiding the gripper body along the respective sliding direction.

10. Clamping system according to claim 9, wherein each of said guide walls is provided with a recess suitable for at least partially receiving one of the holding arms of said pair when the gripper takes up said release configuration.

11. Clamping assembly suitable for picking up, en bloc from a twisting device, a plurality of bar conductors for a stator or rotor winding for an electric machine, comprising a clamping system as defined in claim 1.

12. Clamping assembly according to claim 11, further comprising a clamp axis (Y-Y) and a clamping sub-assembly including a plurality of holding fingers extending around the clamp axis (Y-Y) substantially in the direction of such an axis (Y-Y).

13. Clamping assembly according to claim 12, wherein the clamp axis (Y-Y) is a vertical axis and the clamping system is situated above the holding fingers.

14. Containment apparatus for the twisting suitable for obtaining containment to control the shaping of bar conductors for a stator or rotor winding for an electric machine during a twisting step of such conductors, said apparatus comprising a clamping system as defined in claim 1.

15. Process for clamping special conductors for a stator or rotor bar winding for an electric machine during a twisting step of said special conductors and/or during a step of picking up the special conductors from a twisting device, comprising the steps of:

(a) providing a clamping system of the special conductors comprising a system axis (T-T) and a plurality of grippers aligned or adapted to be aligned along a circumference lying on a plane substantially perpendicular to the system axis (T-T), each gripper including a pair of jaws or holding arms;

(b) moving each gripper along a respective sliding direction (R) transversal to the system axis (T-T) from a relatively set back position with respect to the system axis (T-T) towards a relatively advanced position with respect to the system axis (T-T) to clamp on two opposite sides a portion of at least one of said special conductors;

(c) moving said pair of arms in a plane transversal to the system axis (T-T) so as to bring together such arms to make the gripper take up an operative clamping configuration, in which said holding arms are relatively closer together to clamp on two opposite sides said portion of at least one of said special conductors;

(d) moving each gripper in a sliding manner along said sliding direction (R) from said advanced position towards said set back position to release said portion of special conductor; and (e) moving said pair of arms in the plane transversal to the system axis (T-T) so as to spread apart such arms to make the gripper take up an operative release configuration in which said holding arms are relatively farther apart to release said portion of the special conductor;

wherein each of said grippers comprises a gripper body slidably mounted along said sliding direction (R) transversal to the system axis (T-T), the gripper body including a body portion to which said holding arms are hinged and being suitable for taking up said position relatively more advanced towards the system axis (T-T) when the gripper takes up said clamping configuration, and said position relatively more set back with respect to said advanced position when the gripper takes up said release configuration; and said clamping system comprising closing elements and opening elements of the arms of the grippers, said closing elements comprising a forced passage arranged frontally to each pair of holding arms and suitable for engaging such arms during the sliding of the gripper body towards said advanced position to make the gripper take up said clamping configuration, and said opening elements comprising elastic elements connected to said pair of holding arms and suitable for spreading apart such arms while the gripper slides towards said set back position leaving the forced passage so as to allow the gripper to take up said release configuration.

* * * * *